United States Patent
Scheim et al.

(10) Patent No.: US 7,645,516 B2
(45) Date of Patent: Jan. 12, 2010

(54) CROSS-LINKABLE SILOXANE UREA COPOLYMERS

(75) Inventors: Uwe Scheim, Coswig (DE); Wolfgang Ziche, Burghausen, DE (US)

(73) Assignee: Wacker Chemie AG, Munich (DE)

( * ) Notice: Subject to any disclaimer, the term of this patent is extended or adjusted under 35 U.S.C. 154(b) by 549 days.

(21) Appl. No.: 11/572,281

(22) PCT Filed: Jul. 14, 2005

(86) PCT No.: PCT/EP2005/007685

§ 371 (c)(1),
(2), (4) Date: Jan. 18, 2007

(87) PCT Pub. No.: WO2006/010486

PCT Pub. Date: Feb. 2, 2006

(65) Prior Publication Data

US 2008/0045671 A1  Feb. 21, 2008

(30) Foreign Application Priority Data

Jul. 23, 2004  (DE) ........................ 10 2004 035 710

(51) Int. Cl.
*B32B 27/40* (2006.01)
(52) U.S. Cl. ...................... 428/423.1; 428/447; 528/28; 528/44; 528/45; 528/38; 528/34
(58) Field of Classification Search .................. 528/28, 528/44, 45, 38, 34; 428/447, 423.1
See application file for complete search history.

(56) References Cited

U.S. PATENT DOCUMENTS

| 3,886,226 A | 5/1975 | Asai et al. |
| 2002/0013442 A1* | 1/2002 | Sherman et al. ............... 528/28 |
| 2002/0127413 A1 | 9/2002 | Shores et al. |
| 2005/0137327 A1* | 6/2005 | Ziche ........................ 524/838 |

FOREIGN PATENT DOCUMENTS

| DE | 101 13 980 A1 | 10/2002 |
| EP | 0 163 214 A2 | 12/1985 |
| EP | 0 250 248 B1 | 11/1997 |
| JP | 9-12864 | 1/1997 |
| WO | WO-96/34030 | 10/1996 |
| WO | WO-03/018704 A1 | 3/2003 |

OTHER PUBLICATIONS

Patbase abstract corresponding to DE 101 13 980 A1.
Patent abstract corresponding to JP 9-12864.
WO 96/34030 takes the place of EP 0 822 952 A1.
Yilgör et al., Segmented organosiloxane copolymers. Synthesis of siloxane-urea copolymers, Polymer, 1984, pp. 1800-1806, vol. 25.

* cited by examiner

*Primary Examiner*—Randy Gulakowski
*Assistant Examiner*—Olatunde S Ojurongbe
(74) *Attorney, Agent, or Firm*—Brooks Kushman P.C.

(57) ABSTRACT

Organopolysiloxaneurea polymers with good melt viscosity but which effectively crosslink in the presence of moisture contain alkylalkoxysilane or alkylaminoalkylalkoxysilane groups pendant to the polymer chain. The polymers are useful as non-creeping hot melt adhesives, and for other uses as well.

11 Claims, No Drawings

CROSS-LINKABLE SILOXANE UREA COPOLYMERS

CROSS-REFERENCE TO RELATED APPLICATION

This application is the U.S. national phase of PCT Appln. No. PCT/EP2005/007685 filed Jul. 14, 2005, which claims priority to German application 10 2004 035 710.2 filed Jul. 23, 2004.

BACKGROUND OF THE INVENTION

1. Field of the Invention

The invention relates to crosslinkable organopolysiloxane-polyurea copolymers, to a process for preparing the crosslinkable organopolysiloxane-polyureacopolymers, and to their use, and also to crosslinkable compositions comprising the crosslinkable organopolysiloxane-polyurea copolymers, to the preparation of the crosslinkable compositions, to their vulcanization, and to the use of the vulcanizates.

2. Description of the Related Art

Organopolysiloxane-polyurea block copolymers are known and are prepared by copolymerizing diisocyanates and siloxanes terminated with aminoalkyl groups (Polymer, Vol. 25 (1984, p. 1800 f.).

The formation of hydrogen bonds between the urea groups allows these copolymers to be thermoplastic elastomers. Such copolymers are therefore plastic above the softening point, while below it they have elastic properties. Hence they can be used, for example, as hotmelt adhesives. A disadvantage of the use of such copolymers as hotmelt adhesives is, however, that the adhesive bond is reversible by an increase in temperature beyond the softening point. Moreover, moldings or adhesive bonds produced from such copolymers are subject to cold flow, as even below the softening point hydrogen bonds are able continually to separate and reattach, so that deformation and hence failure of the desired function are possibilities. Accordingly the field of use is limited to applications where no heightened temperatures and/or forces act on the thermoplastic elastomer.

One solution to the problem is to crosslink the individual polymer chains additionally with covalent bonds, i.e., thermally irreversible bonds. If, in production, the thermoplastic elastomers are crosslinked through the use, for example, of trifunctional units, then the processing properties (e.g., melt viscosity) may be adversely affected. Crosslinking after application is therefore more sensible.

EP 0 250 248 B1, EP 0 822 952 A1 and DE 101 13 980 A1 describe, for example, organopolysiloxane-polyurea block copolymers which have been provided with moisture-crosslinkable silyl end groups. This allows crosslinking by the end groups, after application in liquid melt form. The achievable crosslinking density is low, however, particularly in the case of long-chain block copolymers with a small end group concentration, but on the other hand a high degree of polymerization of the block copolymers is necessary for the development of the thermoplastic properties.

SUMMARY OF THE INVENTION

It has now been discovered that organopolysiloxane-polyurea copolymers with satisfactory melt viscosity coupled with good crosslinking ability are provided by copolymers bearing at least one chain nitrogen-bonded alkylalkoxysilane group. The polymers may be easily produced by reacting amino-terminated siloxanes and aminoalkyl-functional alkoxy silanes with a diisocyanate.

The invention provides copolymers of the general formula

in which (A) can be alike or different and is a unit of the formula

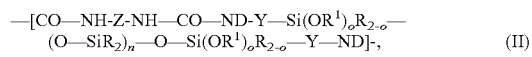

(B) can be alike or different and is a unit of the formula

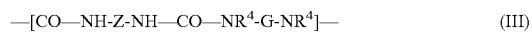

and (C) can be alike or different and is a unit of the formula

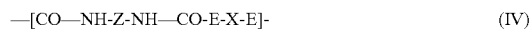

where

X can be alike or different and is an alkylene radical which has 1 to 700 carbon atoms, which is unsubstituted or substituted by fluorine, chlorine, $C_1$-$C_6$ alkyl or $C_1$-$C_6$ alkyl ester and in which methylene units not adjacent to one another can be replaced by groups —O—, —COO—, —OCO— or —OCOO—, or is unsubstituted or substituted arylene radical having 6 to 22 carbon atoms, Y can be alike or different and is a divalent hydrocarbon radical which has 1 to 30 carbon atoms and in which methylene units not adjacent to one another can be replaced by groups —O—, or is the radical —$(CH_2)_3$—NH—$SiR_2$—$(CH_2)_3$—NH—, Z can be alike or different and is a divalent hydrocarbon radical which has 1 to 30 carbon atoms and is unsubstituted or substituted by fluorine or chlorine, D can be alike or different and is hydrogen atom or a monovalent, unsubstituted or substituted hydrocarbon radical, E can be alike or different and is an oxygen atom or an amino group —ND-, R can be alike or different and is a monovalent hydrocarbon radical which has 1 to 20 carbon atoms and is unsubstituted or substituted by fluorine or chlorine, $R^1$ can be alike or different and is hydrogen atom or a monovalent hydrocarbon radical which has 1 to 20 carbon atoms and is unsubstituted or substituted by fluorine, chlorine or organyloxy groups, or is —(C=O)—R or —N=$CR_2$, $R^4$ can be alike or different and is a radical of the formula -Z'-$SiR_p(OR^1)_{3-p}$ with Z' equal to a definition specified above for Z, and p being 0, 1 or 2, or is hydrogen atom or a monovalent, unsubstituted or substituted hydrocarbon radical, G can be alike or different and has a definition specified for Z, R" is hydrogen atom or a radical —CO—NH-Z-NCO, preferably hydrogen atom, R' if R" is hydrogen atom is a radical HND-Y—$Si(OR^1)_o$ $R_{2-o}$—(O—$SiR_2)_n$—O—$Si(OR^1)_oR_{2-o}$—Y—ND-, $HNR^4$-G-$NR^4$— or HE-X-E-, preferably HND-Y—Si $(OR^1)_oR_{2-o}$—(O—$SiR^2)_n$—O—$Si(OR^1)_oR_{2-o}$—Y—ND- or $HNR^4$-G-$NR^4$—, and if R" is radical —CO—NH-Z-NCO has the definition of radical

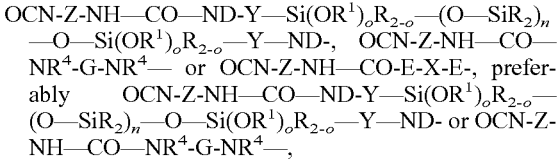

n can be alike or different and is an integer from 1 to 4000,
o can be alike or different and is 0, 1 or 2, preferably 0,
a is an integer of at least 1,
b is an integer of at least 1,
c is 0 or an integer of at least 1, with the proviso that per molecule at least one radical $R^4$ has the definition of $-Z'-SiR_p(OR^1)_{3-p}$ and also the individual blocks (A), (B) and (C) can be distributed randomly in the polymer.

For the purposes of the present invention the term "organopolysiloxanes" is intended to encompass polymeric, oligomeric, and dimeric siloxanes.

Examples of divalent radicals Z are alkylene radicals such as the methylene, ethylene, n-propylene, iso-propylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; alkenylene radicals such as the vinylene and the allylene radical; cycloalkylene radicals such as the cyclopentylene, cyclohexylene, cycloheptylene and methylcyclohexylene radicals; arylene radicals such as the phenylene and the naphthylene radicals; alkarylene radicals such as the o, m-, and p-tolylene radicals, xylylene radicals and ethylphenylene radicals; and aralkylene radicals such as the benzylene radical, the α- and the β-phenylethylene radical, and also the 4,4'-methylenediphenylene radical.

Radicals Z preferably comprise alkylene groups having 1 to 24 carbon atoms, more preferably hexylene, 4,4'-methylenebiscyclohexylene and 3-methylene-3,5,5-trimethylcyclohexylene radicals.

Examples of the divalent radicals G are the examples listed for Z. Radicals G preferably comprise alkylene radicals having 1 to 6 carbon atoms, arylene radicals such as the o-, m-, or p-phenylene radicals, and aralkylene radicals such as the phenylethylene radical, with radical —$CH_2CH_2$— being particularly preferred.

Examples of Z' are all examples stated for Z. Radical Z' preferably comprises alkylene groups having 1 to 24 carbon atoms, more preferably alkylene groups having 1 or 3 carbon atoms.

Examples of Y are all examples specified for Z. Radical Y preferably comprises alkylene radicals having 1 to 30 carbon atoms, in which methylene units not adjacent to one another can be replaced by groups —O—, or comprises arylene radicals having 6 to 22 carbon atoms. With particular preference radical Y comprises alkylene groups having 1 to 3 carbon atoms, especially alkylene groups having 1 or 3 carbon atoms.

Examples of radical X are the butylene radical, ethylene radical, hexylene radical, —$(CH_2)_3$—$(O$—$CH(CH_3)$—$CH_2)_{2-3000}$—$O$—$O(CH_2)_3$—, —$CH(CH_3)$—$CH_2$—$(O$—$CH(CH_3)$—$CH_2)_{2-3000}$—, —$(CH_2)_3$—$(O$—$CH_2$—$CH_2)_{2-300}$—$O(CH_2)_3$—, and —$CH_2$—$CH_2$—$(OCH_2$—$CH_2)_{2-300}$—radicals. Radical X preferably comprises popyether radicals, more preferably polyoxypropylene glycol radicals, especially those having 2 to 600 carbon atoms.

Examples of radical R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radical; cycloalkyl radicals such as the cyclopentyl, cyclohexyl, cycloheptyl and methylcyclohexyl radicals; aryl radicals such as the phenyl and the naphthyl radicals; alkaryl radicals such as the o, m-, and p-tolyl radicals, xylyl radicals and ethylphenyl radicals; and aralkyl radicals such as the benzyl radical, and the α- and the β-phenylethyl radicals.

With preference, radical R is a hydrocarbon radical having 1 to 6 carbon atoms, more preferably an alkyl radical having 1 to 4 carbon atoms, especially the methyl radical.

Examples of radical $R^1$ are the examples specified for radical R, and also alkoxyalkyl radicals.

With preference radical $R^1$ comprises linear or branched alkyl radicals having 1 to 12 carbon atoms and alkoxyalkyl radicals such as the 2-methoxyethyl, 2-ethoxyethyl, and 2-(2'-methoxyethyl)ethyl radicals, more preferably alkyl radicals having 1 to 12 carbon atoms, especially the methyl and ethyl radicals.

Examples of radical $R^4$ are the radicals specified for R, the hydrogen atom, and also the radicals —$(CH_2)_4Si(OCH_3)_3$, —$(CH_2CH(CH_3)CH_2)Si(OCH_3)_3$, $(CH_2CH(CH_3)CH_2)Si(OCH_2CH_3)_3$, $(CH_2CH(CH_3)CH_2)SiCH_3(OCH_3)_2$, —$(CH_2CH(CH_3)CH_2)SiCH_3(OCH_2CH_3)_3$, $(CH_2)_3Si(OCH_3)_3$, $(CH_2)_3Si(OCH_2CH_3)_3$, —$(CH_2)_3SiCH_3(OCH_3)_2$, $(CH_2)_3SiCH_3(OCH_2CH_3)_2$, —$CH_2Si(OCH_3)_3$, —$CH_2Si(OCH_2CH_3)_3$, $CH_2SiCH_3(OCH_3)_2$, —$CH_2SiCH_3(OCH_3)_2$, $(CH_2)_3SiCH_3(OCH_2CH_2OCH_3)_2$, and $C_6H_4$—$(CH_2)_2SiCH_3(OCH_2CH_3)_2$.

Preferably radical $R^4$ comprises the hydrogen atom and the above-indicated silyl-substituted alkyl radicals, more preferably a hydrogen atom and the radicals $(CH_2)_3Si(OCH_3)_3$, $(CH_2)_3Si(OCH_2CH_3)_3$, —$(CH_2)_3SiCH_3(OCH_3)_2$, —$(CH_2)_3SiCH_3(OCH_2CH_3)_2$, $CH_2Si(OCH_3)_3$, —$CH_2Si(OCH_2CH_3)_3$, $CH_2SiCH_3(OCH_3)_2$, and $CH_2SiCH_3(OCH_3)_2$.

Examples of hydrocarbon radicals D are the radicals specified above for R. Radical D is preferably an alkyl radical or hydrogen atom, more preferably an alkyl radical having 1 to 12 carbon atoms or hydrogen atom, in particular, hydrogen.

Radical E is preferably an oxygen atom.

Preferably, a is an integer from 1 to 1000, more preferably from 5 to 1000, and especially 5 to 100; b is an integer form 1 to 1000, more preferably from 5 to 1000, especially 5 to 100; and c is 0 or an integer from 1 to 100, more preferably from 5 to 10, especially 0.

Examples of radicals R' are, if R" is hydrogen atom, radicals which result from the unreacted end groups of the reactants employed, such as $H_2N$—$(CH_2)_3$—$Si(CH_3)_2$—$(O$—$Si(CH_3)_2)_{40}$—$O$—$Si(CH_3)_2$—$(CH_2)_3$—$NH$—, $H_2N$—$CH_2$—$CH_2$—$N$—$(CH_2)_3Si(OCH_3)_3$, and HO—$(CH_2CH(CH_3)O)_{50}$—.

Examples of radicals R' are, if R— is —CO—NH-Z-NCO, radicals which result from the unreacted end groups of the reactants employed, such as OCN—$(CH_2)_6$—NH—CO—HN—$(CH_2)_3$—$Si(CH_3)_2$—$(O$—$Si(CH_3)_2)_{40}$—$O$—$Si(CH_3)_2$—$(CH_2)_3$—NH—, OCN—$C_6H_{10}$—$CH_2$—$C_6H_{10}$—NH—CO—HN—$CH_2$—$CH_2$—N—$(CH_2)_3Si(OCH_3)_3$, and OCN—$C_6H_3(CH_3)$—NH—CO—O—$(CH_2CH(CH_3)O)_{50}$—.

Examples of radicals R" are the hydrogen atom, —CO—NH—$(CH_2)_6$—NCO, —CO—NH—$C_6H_{10}$—$CH_2$—$C_6H_{10}$—NCO and —CO—NH—$C_6H_3(CH_3)$—NCO.

Preferably n is an integer from 10 to 4000, more preferably from 30 to 1000.

Index p is preferably 0.

Copolymers of the invention comprising units (C) may give rise to a harder material in comparison to copolymers of the invention that comprise no unit (C), since there are more hydrogen bonds in them. If the proportion of component (C) becomes too high, separation phenomena occur between the organic and polysiloxane constituents, so that the transparency of the copolymers of the invention is reduced and the copolymers become turbid. Preference is given to polymers of the formula (I) with c as zero, since consequently there are exclusively siloxane chains present and the polymers as a result have advantages, such as high transparency and UV-stability in conjunction with low surface energies, for example.

Examples of copolymers of the formula (I) are $H[NH(CH_2)_3SiMe_2O(SiMe_2O)_{35}SiMe_2(CH_2)_3—NH—CO—NH—(CH_2)_6—NH—CO—NH—CH_2CH_2—N\{(CH_2)_3—Si(OMe)_3\}—CO—NH—(CH_2)_6—NH—CO]_{10}—NH(CH_2)_3SiMe_2O(SiMe_2O)_{35}SiMe_2(CH_2)_3—NH_2$, $H[NH(CH_2)_3Si(OMe)_2O(SiMe_2O)_{35}Si(OMe)_2(CH_2)_3—NH—CO—NH—(CH_2)_6—NH—CO—NH—CH_2CH_2—N\{(CH_2)_3—SiMe(OMe)_2\}—CO—NH—(CH_2)_6—NH—CO]_{10}—NH(CH_2)_3SiMe_2O(SiMe_2O)_{35}SiMe_2(CH_2)_3—NH_2$, $H[[NH(CH_2)_3SiMe_2O(SiMe_2O)_{35}SiMe_2(CH_2)_3—NH—CO—NH—(CH_2)_6—NH—CO—]_5—[NH—CH_2CH_2—N\{(CH_2)_3—Si(OEt)_3\}—CO—NH—(CH_2)_6—NH—CO]_5]_{10}—NH—CH_2CH_2—N\{(CH_2)_3—Si(OEt)_3\}H$, $H[NH(CH_2)_3SiMe_2O(SiMe_2O)_{35}SiMe_2(CH_2)_3—NH—CO—NH—(CH_2)_6—NH—CO—NH—CH_2CH_2—N\{(CH_2)_3—Si(OMe)_3\}—CO—NH—(CH_2)_6—NH—CO—O—(CH_2CH_2O)_5—CO—NH—(CH_2)_6—NH—CO]_{10}—NH(CH_2)_3SiMe_2O(SiMe_2O)_{35}SiMe_2(CH_2)_3—NH_2$, $H[NH—CH_2—SiMe_2O(SiMe_2O)_{35}SiMe_2—CH_2—NH—CO—NH—(CH_2)_6—NH—CO—NH—CH_2CH_2—N\{(CH_2)_3—Si(OMe)_3\}—CO—NH—(CH_2)_6—H—CO—NH—(CH_2CH_2O)_5—CH_2CH_2—NH—CO—NH—(CH_2)_6—NH—CO]_{10}—CH_2—SiMe_2O\ (SiMe_2O)_{35}SiMe_2—CH_2—NH_2$, $H[NH(CH_2)_3SiMe_2O(SiMe_2O)_{35}SiMe_2(CH_2)_3—NH—CO—NH—C_{10}H_{20}—NH—CO—NH—CH_2CH_2—N\{CH_2—SiMe(OEt)_2\}—CO—NH—C_{10}H_{20}—NH—CO]_{10}—NH(CH_2)_3SiMe_2O(SiMe_2O)_{35}SiMe_2(CH_2)_3—NH_2$, $OCN—C_7H_6—NH—CO—[NH(CH_2)_3SiMe_2O(SiMe_2O)_{35}SiMe_2(CH_2)_3—NH—CO—NH—C_7H_6—NH—CO—NH—CH_2CH_2—N\{(CH_2)_3—Si(OMe)_3\}—CO—NH—C_7H_6—NH—CO]_{10}—NH(CH_2)_3SiMe_2O(SiMe_2O)_{35}SiMe_2(CH_2)_3—NH—CO—NH—C_7H_6—NCO$, and $OCN—C_7H_6—NH—CO—[NH(CH_2)_3SiMe_2O(SiMe_2O)_{35}SiMe_2(CH_2)_3—NH—CO—NH—C_7H_6—NH—CO—NH—CH_2CH_2—N\{(CH_2)_3—Si(OMe)_3\}—CO—NH—C_7H_6—NH—CO]_{10}—NH—CH_2CH_2—N\{(CH_2)_3—Si(OMe)_3\}—CO—NH—C_7H_6—NCO$.

The inventive copolymers of the formula (I) contain preferably greater than 70% by weight, more preferably greater than 80% by weight, of units A of the formula (II), based in each case on the total weight of the copolymer.

At room temperature the inventive copolymers of the formula (I) are preferably rubber-elastic solids preferably having tensile strengths of between about 0.5 and 20 MPa and also elongations at break between about 50% to 1000%. They preferably soften at temperatures between 60 and 200° C., and in so doing they lose their rubber-elastic properties. By exposure to moisture it is possible for the hydrolyzable radicals $OR_1$ to react to form OH groups, which in turn are able to undergo condensation with further $OR_1$ or OH groups to form siloxane bonds. As compared to the starting polymer prior to crosslinking, the inventive polymers of the formula (I) when additionally crosslinked in this way preferably have a softening point which is shifted markedly in the direction of higher temperatures. This opens up the possibility of preparing polymers which can be processed at relatively low temperatures but then in use can be exposed to higher temperatures.

The copolymers of the invention have the advantage, moreover, that they have very good mechanical properties without any need to add fillers, and are distinguished by outstanding physical properties of the kind generally associated with polyorganosiloxanes, such as low glass transition temperatures, transparency, good resistance to light, low surface energies, low hydrophobicity, good dielectric properties, and high gas permeability, for example. Further advantages of the copolymers of the invention are the high thermal and oxidative stabilities, and good stabilities toward swelling and decomposition by hydrocarbon solvents.

In accordance with the number of the units (C) in the copolymers of the invention it is possible to tailor properties such as peel strength and detachment resistance, printability, tensile strength, tear strength, or water-vapor permeability, for example.

The copolymers of the invention can be prepared by analogy with any desired processes which are already known to the skilled worker and which are used, for example, for the synthesis of (pre)polymers for polyurethanes.

The present invention further provides a process for preparing the inventive copolymers of the formula (I) by reacting a) at least one polymer of the formula $$H—ND—Y—Si(OR^1)_oR_{2-o}—(O—SiR_2)_n—O—Si(OR^1)_oR_{2-o}—Y—ND-H \qquad (V),$$

b) at least one compound of the formula $$H—NR^4\text{-}G\text{-}NR^4—H \qquad (VI),$$

c) at least one diisocyanate of the formula $$OCN\text{-}Z\text{-}NCO \qquad (VII)$$

or blocked diisocyanates (thermally unstable reaction products of isocyanates with, for example, phenols, ketoximes, malonic esters, nitrogen-containing heterocycles), d) if desired compounds of the formula $$H\text{-}E\text{-}X\text{-}E\text{-}H \qquad (VIII),$$

e) if desired a catalyst, and f) if desired at least one solvent,

X, Y, Z, D, E, G, R, $R^1$, $R^4$, and o being as defined above.

Examples of the inventively used compounds of the formula (V) are α,ω-aminopropyldimethylsilyl-terminated polydimethylsiloxanes, α,ω-aminopropyldimethoxysilyl-terminated polydimethylsiloxanes, α,ω-aminomethyldimethylsilyl-terminated polydimethylsiloxanes, and α,ω-aminomethyldimethoxysilyl-terminated polydimethylsiloxanes.

Preferred compounds of the formula (VI) which can be used in the process of the invention are 3-(2-amino-ethyl) aminopropyltrimethoxysilane, 3-(2-aminoethyl)-aminopropyltriethoxysilane, 3-(2-aminoethyl)aminopropylmethyldimethoxysilane, 3-(2-aminoethyl) aminopropyldimethylmethoxysilane, 3-(2-aminoethyl) aminopropylmethyldiethoxysilane, N,N'-bis(3-trimethoxysilylpropyl)ethylenediamine, N,N'-bis(3-triethoxysilylpropyl)ethylenediamine, N,N'-bis(3-dimethoxymethylsilylpropyl)ethylenediamine, and N,N'-bis (3-diethoxymethylsilylpropyl)ethylenediamine, N-trimethoxysilylmethylethylenediamine, N-triethoxysilylmethylethylenediamine, N-dimethoxymethylsilylmethylethylenediamine, N-diethoxymethylsilylmethylethylenediamine, and N-methoxydimethylsilylmethylethylenediamine.

Examples of the inventively used isocyanates of the formula (VII) are hexylene diisocyanate, 4,4'-methylenedicyclohexylene diisocyanate, 4,4'-methylenediphenylene diisocyanate, 1,3-diazetidine-2,4-dione bis(4,4'-methylenedicyclohexyl)diisocyanate, 1,3-diazetidine-2,4-dione bis(4,4'-methylenediphenyl)diisocyanate, tetramethylenexylylene diisocyanate, and isophorone diisocyanate, preference being given to hexylene diisocyanate, 4,4'-methylenedicyclohexylene diisocyanate, 4,4'-methylenediphenylene diisocyanate, tetramethylenexylylene diisocyanate, and isophorone diisocyanate, and particular preference to hexylene diisocyanate, 4,4'-methylenedicyclohexylene diisocyanate, and isophorone diisocyanate.

Examples of the compounds of the formula (VIII) inventively used are compounds known from polyurethane chemistry, for example diols such as ethylene glycol, polyethylene glycols, polypropylene glycols, polyester polyols, diamines such as ethylenediamine, 5-amino-3-(aminomethyl)-1,3,3-trimethylcyclohexane), bis(4-amino-3-methylphenyl)methane, isomer mixtures of diaminodiethylmethylbenzene, bis(4-amino-3-chlorophenyl)methane, 2-methylpropyl 4-chloro-3,5-diaminobenzoate, and amino-terminated polyethers (ATPE), for example.

The stoichiometry of the reactants for preparing the copolymers of the invention is preferably selected such that the molar ratio of the isocyanate groups from the compounds of the formula (VII) to the sum of the EH and NH groups, reactive with the isocyanate groups, from the compounds of the formulae (V), (VI), and (VIII) is in the range from 0.7 to 1.3, more preferably 0.95 to 1.05, and in particular 1. With a ratio of the isocyanate groups to the reactive groups of greater than 1, i.e., an excess of isocyanate groups, inventive polymers of the formula (I) are produced with R"=NH—CO-Z-NCO and the resultant radicals R' as defined above at the other end of the polymer chains. With a ratio less than 1, i.e., a deficit amount of isocyanate groups, inventive polymers of the formula (I) are produced with R"=H and the resultant radicals R' as defined above at the other end of the polymer chains. Examples of the catalysts used if desired are all catalysts known to date which promote the addition of the isocyanate groups of the compounds of the general formulae (VII) onto the active groups of the polymers in accordance with the formulae (V), (VI) and (VIII), such as, for instance, diorganotin compounds and bismuth compounds.

If catalysts are used in the inventive process, the amounts involved are preferably from 0.0001 to 1 part by weight, more preferably 0.001 to 0.1 part by weight, based in each case on 100 parts by weight of the total mixture. With particular preference, no catalysts are used in the process.

If solvents are used in the process, the amounts involved are preferably from preferably 10 to 200 parts by weight, more preferably 10 to 100 parts by weight, based in each case on 100 parts by weight of total mixture. Examples of optionally used solvents are tetrahydrofuran, dimethylformamide, isopropanol, and methyl ethyl ketone. With particular preference, no solvents are used in the process.

The reaction of the invention may take place in solution or neat (without solvent), preference being given to a neat reaction. If the reaction of the invention takes place in solution, temperatures are preferably from 0 to 100° C. and with particular preference from 20 to 80° C. If the reaction of the invention takes place neat, temperatures above the softening point of the copolymer of the formula (I) prepared are preferred.

In the case of a discontinuous operation, the process of the invention is preferably carried out under the pressure of the surrounding atmosphere, i.e., at between 900 and 1100 hPa. In the case of continuous preparation, in a twin-screw extruder, for example, the process is preferably operated at a pressure of up to 15 MPa in some sections of the extruder and, for devolatilization, preferably at pressures of 0.1 to 1100 hPa.

The process of the invention is preferably carried out in the absence of moisture, although it is also possible to operate in the presence of water.

The preparation of the inventive copolymers in accordance with the general formula (I) can take place with methods which are known to the skilled worker, such as by means of extruders, compounders, roll mills, dynamic mixers or static mixers, for example. The copolymers of the invention can be prepared continuously or batchwise. Preferably the preparation is carried out continuously.

The siloxane copolymers prepared in accordance with the invention can then be freed by any desired processes known to date from any reactants that may still be present and/or from any solvents and/or catalysts that may have been used, by means of distillation or extraction, for example.

The components used in the process of the invention are commercially customary products and/or can be prepared by methods which are commonplace in chemistry. The components used may in each case be one kind of such a component or else a mixture of two or more kinds of a respective component.

The process of the invention has the advantage that it is simple to implement and that a large number of possible copolymers can be prepared with great variability. The process has the further advantage that copolymers can be prepared in a well-defined way.

The copolymers of the invention and copolymers prepared in accordance with the invention, of the formula (I), can be prepared and processed using the typical processing methods for moisture-crosslinkable polymers and/or thermoplastic elastomers—for example, by means of extrusion, injection molding, blow molding, vacuum thermoforming. Processing in the form of a solution or emulsion or suspension is a further possibility.

Preferred applications of the inventive or inventively prepared copolymers of the formula (I) are uses as a constituent in adhesives and sealants, as a base material for thermoplastic elastomers such as cable sheathing, hoses, seals, and keyboard mats, for example, for membranes, such as selectively gas-permeable membranes, as additives in polymer blends, or for coating applications, for example, in antistick coatings, tissue-compatible coatings, flame-retardant coatings and as biocompatible materials. Further application possibilities are as sealants and adhesives, such as hotmelt adhesives, for example, adhesives for application as a solution, primers for improving the adhesion of sealants and adhesives to different substrates, additives for polymer processing, antifouling coatings, cosmetics, bodycare products, paint additives, an auxiliary in laundry detergents and in the treatment of textiles, for the modification of resins, or for bitumen modification.

The use of the inventive or inventively prepared copolymers is possible in numerous applications, such as, for example, in sealants, adhesives, as material for modifying fibers, as plastics additive, for example, as impact modifiers or flame retardants, as material for defoamer formulations, as a high-performance polymer (thermoplastic, thermoplastic elastomer, elastomer), as packaging material for electronic components, in insulation materials or shielding materials, in cable sheathing, in antifouling materials, as an additive for scouring, cleaning or polishing products, as an additive for bodycare compositions, as a coating material for wood, paper, and paperboard, as a mold release agent, as a biocompatible material in medical applications such as contact lenses, as a coating material for textile fibers or textile fabric, as a coating material for natural substances such as leather and furs, for example, as material for membranes, and as material for photoactive systems—for lithographic techniques, optical data securement or optical data transmission, for example.

Preference extends to the use of the copolymers of the invention as a release coating for adhesive tapes and labels, fiber coating for textiles, for example, extrusion aid for thermoplastics processing, medical devices, such as catheters, infusion bags or infusion tubes, for example, hotmelt adhesives, PSA coatings, components for the automobile industry that can be overpainted and oversprayed, an additive for polymer modification, such as plasticizers or impact modifiers, for example, film for laminated safety glass, or joint sealant for the construction industry.

The copolymers of the invention can be employed wherever organopolysiloxane-polyurea copolymers have been employed to date.

The copolymers of the formula (I) prepared in accordance with the invention are especially suitable for use in crosslinkable compositions, such as compositions crosslinkable at room temperature, for instance.

The present invention further provides crosslinkable compositions comprising inventive or inventively prepared copolymers of the formula (I).

The crosslinkable compositions of the invention are preferably compositions crosslinkable by condensation reaction.

Particular preference is given to crosslinkable compositions comprising
(i) copolymer of the formula (I),
if desired
(ii) crosslinker,
if desired
(iii) catalyst,
if desired
(iv) filler,
if desired
(v) adhesion promoter,
if desired
(vi) further substances selected from the group containing plasticizers, stabilizers, antioxidants, flame retardants, light stabilizers, and pigments, and if desired
(vii) crosslinkable polymers different to (i).

These crosslinkable compositions of the invention are preferably one-component compositions. To prepare these one-component compositions it is possible for the constituents respectively used to be mixed with one another in any desired manner. Mixing preferably takes place at room temperature or at a temperature which comes about when the constituents are combined at room temperature, without additional heating or cooling, and at the pressure of the surrounding atmosphere, in other words about 900 to 1100 hPa. Alternatively, if desired, mixing can take place at higher or lower pressures—at lower pressures, for example, in order to avoid gas inclusions.

The preparation of the compositions of the invention and their storage preferably take place under substantially anhydrous conditions, in order to prevent premature reaction of the compositions.

Crosslinkers (ii) employed if desired can be any crosslinkers which are useful in condensation-crosslinkable compositions. Crosslinker (ii) preferably comprises organyloxysilanes and also their partial hydrolyzates, such as, for example, tetraethoxysilane, tetraisopropoxysilane, tetra-n-propoxysilane, methyltrimethoxysilane, methyltriethoxysilane, n-butyltrimethoxysilane, n-octyltrimethoxysilane, isooctyltrimethoxysilane, vinyltrimethoxysilane, and vinyltriethoxysilane, and their partial hydrolyzates, particular preference being given to methyl- and vinyltrimethoxysilane.

If the crosslinkable compositions of the invention comprise crosslinkers (ii), the amounts involved are from preferably 0.05 to 10 parts by weight, more preferably 0.2 to 5 parts by weight, based in each case on 100 parts by weight of crosslinkable composition.

As catalysts (iii) employed if desired it is possible to use all of the condensation catalysts known to the skilled worker.

Examples of condensation catalysts (iii) are butyl titanates and organotin compounds, such as di-n-butyltin dilaurate and di-n-butyltin diacetate and also its reaction products with the alkoxysilanes specified as crosslinkers and/or adhesion promoters, and dialkyltin oxide solutions in the alkoxysilanes specified as crosslinkers and/or adhesion promoters, preference being given to di-n-butyltin dilaurate and dibutyltin oxide in tetraethoxysilane, and particular preference to di-n-butyltin dilaurate.

If the crosslinkable compositions of the invention comprise catalyst (iii), the amounts involved are from preferably 0.01 to 3 parts by weight, more preferably 0.05 to 2 parts by weight, based in each case on 100 parts by weight of crosslinkable composition.

Fillers (iv) employed if desired can be any fillers which have also been employed to date in crosslinkable compositions. Examples of fillers are reinforcing fillers, which are fillers having a BET surface area of at least 30 $m^2/g$, such as carbon blacks, fumed silica, precipitated silica, and silicon-aluminum mixed oxides, it being possible for said fillers to have been hydrophobicized, and also nonreinforcing fillers, which are fillers having a BET surface area of less than 30 $m^2/g$, such as powders of quartz, cristobalite, diatomaceous earth, calcium silicate, zirconium silicate, montmorillonites, such as bentonites, zeolites, including the molecular sieves, such as sodium aluminum silicate, metal oxides, such as aluminum oxide or zinc oxide and/or their mixed oxides, metal hydroxides, such as aluminum hydroxide, barium sulfate, calcium carbonate, gypsum, silicon nitride, silicon carbide, boron nitride, glass powder, carbon powder, and polymer powders, and hollow glass and plastic beads.

Filler (iv) preferably comprises fumed silicas or carbon blacks or mixtures thereof, carbon black having a BET surface area of at least 30 $m^2/g$ being particularly preferred.

If the compositions of the invention comprise fillers (iv), the amounts involved are from preferably 1 to 50 parts by weight, preferably 2 to 30 parts by weight, based in each case on 100 parts by weight of crosslinkable composition.

As adhesion promoters (v), which can be employed if desired, it is possible to employ any adhesion promoters which have also been employed to date in condensation-crosslinkable compositions. Examples of adhesion promoters (v) are silanes containing hydrolyzable groups and SiC-bonded vinyl, acryloyloxy, methacryloyloxy, epoxy, acid anhydride, acid, ester or ether groups and also their partial hydrolyzates and cohydrolyzates.

Preferred adhesion promoters (v) used are 3-aminopropyltriethoxysilane, 3-(2-aminoethyl)aminopropyltrimethoxysilane, 3-aminopropyltrimethoxysilane and 3-(2-aminoethyl)

aminopropyltriethoxysilane, particular preference being given to 3-aminopropyltriethoxysilane.

If the compositions of the invention comprise adhesion promoters (v), the amounts involved are preferably from 0.01 to 5 parts by weight, more preferably 0.5 to 4 parts by weight, based in each case on 100 parts by weight of crosslinkable composition.

Examples of further substances (vi) are plasticizers such as trimethylsilyl-terminated polydimethylsiloxanes and hydrocarbons having about 16 to 30 carbon atoms, stabilizers such as 2-ethylhexyl phosphate and octylphosphonic acid, polyethers, antioxidants, flame retardants such as phosphoric esters, light stabilizers, and pigments such as titanium dioxide and iron oxides.

The further substances (vi), employed if desired, are preferably plasticizers such as trimethylsilyl-terminated polydimethylsiloxanes and hydrocarbons having about 16 to 30 carbon atoms, stabilizers such as 2-ethylhexyl phosphate, octylphosphonic acid, polyethers, flame retardants such as phosphoric esters, and pigments such as titanium dioxide, iron oxides, particular preference being given to stabilizers and pigments.

If constituent (vi) is employed, the amounts involved are from preferably 0.01 to 30 parts by weight, more preferably 0.05 to 25 parts by weight, based in each case on 100 parts by weight of crosslinkable composition.

The crosslinkable compositions of the invention may if desired comprise crosslinkable polymers (vii), such as organopolysiloxanes having reactive end groups. Examples of crosslinkable siloxanes of this kind are $\alpha,\omega$-dihydroxypolydimethylsiloxanes and $\alpha,\omega$-bis-(dimethoxymethylsilyl)-terminated polydimethylsiloxanes.

Component (vii) employed if desired in the crosslinkable compositions of the invention preferably comprises polydiorganosiloxanes having at least one OH group or a hydrolyzable group at the chain ends, more preferably polydimethylsiloxanes having at least one OH group or a hydrolyzable group at the chain ends, and, in particular, $\alpha,\omega$-dihydroxypolydimethylsiloxanes or $\alpha,\omega$-bis(dimethoxymethylsilyl)-terminated polydimethylsiloxanes, having a viscosity of 100 to 500,000 mPas.

The crosslinkable compositions of the invention preferably comprise component (vii). This constituent is used preferably for adjusting the processing properties, such as viscosity or pot life, for example.

If component (vii) is used, the amounts involved are from preferably 1 to 50 parts by weight, more preferably 2 to 25 parts by weight, based in each case on 100 parts by weight of crosslinkable composition.

The individual constituents of the crosslinkable compositions of the invention may in each case comprise one kind of such a constituent or else a mixture of at least two different kinds of such constituents.

In particular the compositions of the invention contain no further constituents apart from component (i), if desired (ii), (iii), (iv), (v), (vi) and (vii).

The preparation of the crosslinkable compositions of the invention takes place with methods which are known to the skilled worker, such as by means of extruders, compounders, roll mills, dynamic mixers or static mixers, for example. The compositions of the invention can be prepared continuously or batchwise. Preferably the preparation takes place continuously.

The vulcanizates of the compositions of the invention are obtainable by hydrolysis and subsequent condensation of the silanol groups that have formed. The hydrolysis can take place by means of atmospheric humidity or by means of water vapor, water baths or water-containing solutions, in contact with the copolymer of the invention in accordance with the general formula (I).

Preferably the typical water content of the air is sufficient for the crosslinking of the compositions of the invention. The compositions of the invention are crosslinked preferably at room temperature. If desired, crosslinking may also take place at temperatures higher or lower than room temperature, such as at −5 to 15° C. or at 30 to 50° C., and also, for example, by means of water concentrations that exceed the normal water content of the air. Preferably the crosslinking is carried out at a pressure of 100 to 1100 hPa, in particular at the pressure of the surrounding atmosphere, in other words about 900 to 1100 hpa.

The present invention further provides moldings produced by crosslinking the compositions of the invention.

In comparison to non-crosslinked thermoplastic siloxane-urea copolymers of the prior art, the vulcanizates of the copolymers of the invention have, after moisture crosslinking, a lower dependence of the mechanical properties on the temperature. Through crosslinking, the vulcanizates of the copolymers of the invention lose their plasticity when the temperature is increased, and so are no longer able to flow and are therefore more dimensionally stable. All in all, therefore, the vulcanizates of the invention have better mechanical properties over a wider temperature range, and so can be used in more diverse fields of use.

The crosslinkable compositions of the invention are used preferably as an adhesive, hotmelt adhesive, PSA (pressure-sensitive adhesive), sealant, coating for substrates including paper, textile, fibers or silicatic surfaces, for example, impregnating agent, paint, constituent in composite materials, additive for polymers, molding, and component for medical use, and also for use in automobile construction or laminated glass.

The compositions of the invention have the advantage that they possess all of the abovementioned advantages of the copolymers of the invention that are used, and have the additional advantage that they exhibit very good mechanical properties. Further advantages of the compositions of the invention are the high thermal and oxidative stability, and good stabilities toward swelling and decomposition by hydrocarbon-containing solvents. The compositions of the invention also have the advantage that properties such as peel strength and detachment resistance, printability, tensile strength and tear strength, or water-vapor permeability, for example, can be tailored.

The moldings of the invention have the advantage of possessing a relatively low dependence of the mechanical properties on the temperature, in particular at relatively high temperatures. The moldings of the invention have the advantage, moreover, of exhibiting very good adhesion to substrates.

In the examples described below, all viscosity data relate to a temperature of 25° C. Unless indicated otherwise, the examples below are carried out at the pressure of the surrounding atmosphere, in other words at about 1000 hPa, and at room temperature, in other words at about 23° C., or at a temperature which comes about when the reactants are combined at room temperature without additional heating or cooling, and also at a relative atmospheric humidity of about 50%. Moreover, all parts and percentages data, unless otherwise indicated, are based on weight.

The Shore A hardness is determined in accordance with DIN (Deutsche Industrie Norm [German Industry Standard]) 53505 (August 2000 edition).

Tensile strength, elongation at break and modulus (stress at 100% elongation) were determined in accordance with DIN 53504 (May 1994 edition) on specimens of shape S2.

EXAMPLE 1

20 g of an α,ω-aminopropyl-terminated polydimethylsiloxane having a molecular weight of 2890 g/mol (13.8 mmol of $NH_2$) and a viscosity of 50 mPas, and 5.00 g of 3-(2-aminoethyl)aminopropyltrimethoxysilane (45.0 mmol of NH) were dissolved in 40 g of tetrahydrofuran (THF). With moisture excluded, this solution was admixed with 5.89 g of dicyclohexylmethane 4,4-diisocyanate (HMDI) (45.0 mmol of NCO) in 10 g of THF. In the course of this procedure the temperature rose to 32° C. Subsequently the mixture was heated at 50° C. for 2 hours. After the mixture had cooled, the solvent was removed by evaporation.

A crystal-clear colorless thermoplastic material was obtained. From this material a sheet 2 mm thick was pressed in a press at 170° C., and test specimens of S2 form in accordance with DIN 53504 were punched from this sheet. The following mechanical characteristics were ascertained: hardness 63 Shore A, tensile strength 3.1 MPa, breaking elongation 118%, stress at 100% elongation 2.83 MPa.

EXAMPLE 2

18.0 g of an α, ω-aminopropyl-terminated polydimethylsiloxane having a molecular weight of 2890 g/mol (12.5 mmol of $NH_2$) and a viscosity of 50 mPas and 2.0 g of 3-(2aminoethyl)aminopropyltrimethoxysilane (18.0 mmol of NH) were dissolved in 40 g of tetrahydrofuran (THF). With moisture excluded, this solution was admixed with 5.24 g of dicyclohexylmethane 4,4-diisocyanate (HMDI) (40.0 mmol of NCO) in 10 g of THF. In the course of this procedure the temperature rose to 32° C. Subsequently the mixture was heated at 50° C. for 2 hours. After the mixture had cooled, the solvent was removed by evaporation.

A crystal-clear colorless thermoplastic material was obtained. From this material a sheet 2 mm thick was pressed in a press at 170° C., and test specimens of S2 form in accordance with DIN 53504 were punched from this sheet. The following mechanical characteristics were ascertained: hardness 62 Shore A, tensile strength 4.19 MPa, breaking elongation 259%, stress at 100% elongation 2.50 MPa.

EXAMPLE 3

23.4 g of an α, ω-aminopropyl-terminated polydimethylsiloxane having a molecular weight of 3140 g/mol (14.9 mmol of NH) and a viscosity of 70 mPas, and 1.66 g of 3-(2aminoethyl)aminopropyltrimethoxysilane (15.0 mmol of NH) were dissolved in 23 ml of tetrahydrofuran (THF). With moisture excluded, this solution was admixed with 3.91 g of dicyclohexylmethane 4,4-diisocyanate (HMDI) (29.8 mmol of NCO) in 5 ml of THF. In the course of this procedure, the temperature rose to 40° C. and the solution quickly became very viscous. After the mixture had cooled, the solvent was removed by evaporation. A crystal-clear colorless thermoplastic material was obtained. From this material a sheet 2 mm thick was pressed in a press at 170° C., and test specimens of S2 form in accordance with DIN 53504 were punched from this sheet.

EXAMPLE 4

The first sector of a co-rotating W&P twin-screw extruder (25 mm screw diameter, L/D=40) was fed with a mixture comprising 12.2 kg/h of an aminopropyl-terminated polydimethylsiloxane (amine number 34 mg KOH/g; 7.41 mol of NH/h) and 0.20 kg/h of 3-(2-aminoethyl)aminopropyltrimethoxysilane (1.80 mol NH/h). The temperature at this point in the extruder was 150° C. In the second sector of the extruder 1.12 kg/h of tetramethylxylylene diisocyanate (9.21 mol NCH/h) were metered in additionally. The temperature of the extruder at this point was 170° C. The remaining sectors were held at 150° C., while finally, in the penultimate sector, evacuation took place at 100 mbar. At the end of the extruder there emerged a crystal-clear colorless thermoplastic extrudate, which was comminuted in a downstream pelletizer. The resultant pellets were pressed in a press at 170° C. to give a sheet 2 mm thick, from which test specimens of form S2 in accordance with DIN 53504 were punched. The following mechanical characteristics were ascertained: hardness 57 Shore A, tensile strength 2.96 MPa, breaking elongation 376%, stress at 100% elongation 2.07 MPa.

EXAMPLE 5

30.89 g of the polymer prepared according to Example 1 are dissolved in 40 ml of THF and the solution is admixed in succession with 0.05 g of methyltrimethoxysilane, 0.2 g of 3-(2-aminoethyl)aminopropyltrimethoxysilane, 0.10 g of dibutyltin dilaurate and 0.05 g of octylphosphonic acid.

This mixture was poured into a PTFE mold 2 mm deep, and the solvent, THF, was left to evaporate. From the approximately 1 mm thick film which remained, specimens of the form S2 in accordance with DIN 53504 were punched, and were subsequently stored in water for 24 hours.

The crystal-clear, colorless specimens were found by measurement to have the following mechanical characteristics: hardness 60 Shore A, tensile strength 5.32 MPa, breaking elongation 390%, stress at 100% elongation 2.31 MPa.

EXAMPLE 6

56 g of the product prepared in Example 4 are dissolved in 150 ml of tetrahydrofuran and the solution is mixed with 0.2 g of aminoethylaminopropyltrimethoxysilane, 0.1 g of a tin condensation catalyst (obtained by reacting dibutyltin diacetate and tetrethoxysilane) and 0.1 g of octylphosphonic acid. The solution is poured into a dish, the solvent is evaporated, and S2 test specimens are punched from the resultant film. Hardness in Shore A: 68, tensile strength: 4.25 MPa, breaking elongation: 151%, stress value at 100% elongation: 3.17 MPa.

After 2 days' storage in water (25° C.) the specimens had the following values: Hardness in Shore A: 68, tensile strength: 4.24 MPa, breaking elongation: 154%, stress value at 100% elongation: 3.14 MPa.

The invention claimed is:

1. Copolymers of the formula:

$$R'-[(A)_a(B)_b(C)_c]-R'' \quad (I),$$

in which (A) each independently is a unit of the formula $$-[CO-NH-Z-NH-CO-ND-Y-Si(OR^1)_oR_{2-o}-(O-SiR_2)_n-O-Si(OR^1)_oR_{2-o}-Y-ND]- \quad (II),$$

(B) each independently is a unit of the formula $$-[CO-NH-Z-NH-CO-NR^4-G-NR^4]- \quad (III)$$

and (C) each independently is a unit of the formula $$-[CO-NH-Z-NH-CO-E-X-E]- \quad (IV)$$

where

X each independently is an alkylene radical having 1 to 700 carbon atoms, which is unsubstituted or substituted by fluorine, chlorine, $C_1$-$C_6$ alkyl or $C_1$-$C_6$ alkyl ester and in which non-adjacent methylene units are optionally replaced by groups O, COO, OCO or OCOO, or is an unsubstituted or substituted arylene radical having 6 to 22 carbon atoms, Y each independently is a divalent hydrocarbon radical having 1 to 30 carbon atoms in which non-adjacent methylene units are optionally replaced by O, or is the radical $(CH_2)_3NHSiR_2(CH_2)_3NH$, Z each independently is a divalent hydrocarbon radical which has 1 to 30 carbon atoms and is unsubstituted or substituted by fluorine or chlorine, D each independently is hydrogen or a monovalent, unsubstituted or substituted hydrocarbon radical, E each independently is an oxygen atom or an amino group —ND-, R each independently is a monovalent hydrocarbon radical which has 1 to 20 carbon atoms and is unsubstituted or is substituted by fluorine or chlorine, $R^1$ each independently is hydrogen or a monovalent hydrocarbon radical which has 1 to 20 carbon atoms and is unsubstituted or is substituted by fluorine, chlorine or organyloxy groups, or is —(C=O)—R or —N=$CR_2$, $R^4$ each independently is a radical of the formula -Z'-$SiR_p$$(OR^1)_{3-p}$ where Z' is defined as for Z, and p is 0, 1 or 2, or is hydrogen or a monovalent, unsubstituted or substituted hydrocarbon radical, G each independently is defined as for Z, R" is a hydrogen atom or a radical —CO—NH-Z-NCO, R' if R" is hydrogen atom, is a radical HND-Y—Si$(OR^1)_o$$R_{2-o}$—(O—$SiR_2$)$_n$—O—Si$(OR^1)_o$$R_{2-o}$—Y—ND-, HN$R^4$-G-N$R^4$— or HE-X-E-, and if R" is a radical —CO—NH-Z-NCO, is a radical OCN-Z-NH—CO—ND-Y—Si$(OR^1)_o$$R_{2-o}$—(O—$SiR_2$)$_n$—O—Si$(OR^1)_o$$R_{2-o}$—Y—ND-, OCN-Z-NH—CO—N$R^4$-G-N$R^4$— or OCN-Z-NH—CO-E-X-E-, n each independently is an integer from 1 to 4000, o each independently is 0, 1 or 2, a is an integer of at least 1, b is an integer of at least 1, c is 0 or an integer of at least 1, with the proviso that per molecule at least one radical $R^4$ which is -Z'-$SiR_p$$(OR^1)_{3-p}$ is present, and wherein the individual blocks (A), (B) and (C) are distributed in any manner in the polymer.

2. The copolymers of claim 1, wherein E is oxygen atom.

3. A process for preparing a copolymer of claim 1, comprising reacting a) at least one polymer of the formula

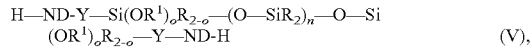

b) at least one compound of the formula

c) at least one diisocyanate of the formula

or a blocked derivative thereof, d) optionally one or more compound(s) of the formula

e) in the presence or absence of a catalyst, and f) optionally in the presence of solvent.

4. The process of claim 3, wherein the reaction takes place neat.

5. A crosslinkable composition comprising a copolymer of claim 1.

6. A crosslinkable composition comprising a copolymer prepared by the process of claim 3.

7. A crosslinkable composition of claim 5, comprising:
(i) at least one copolymer of the formula (I), and
(ii) at least one crosslinker.

8. The crosslinkable composition of claim 7, further comprising at least one crosslinkable polymer different from (i).

9. A molding produced by crosslinking the composition of claim 5.

10. A molding produced by crosslinking the composition of claim 6.

11. A molding produced by crosslinking the composition of claim 7.

* * * * *